United States Patent
Sugiura et al.

(10) Patent No.: US 11,901,558 B2
(45) Date of Patent: Feb. 13, 2024

(54) LITHIUM NIOBATE AND METHOD FOR PRODUCING THE SAME

(71) Applicant: TOYOTA JIDOSHA KABUSHIKI KAISHA, Toyota (JP)

(72) Inventors: Koichi Sugiura, Toyota (JP); Nariaki Miki, Okazaki (JP); Kazuki Muraishi, Toyota (JP); Kengo Matsuo, Sunto-gun (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 76 days.

(21) Appl. No.: 17/566,054

(22) Filed: Dec. 30, 2021

(65) Prior Publication Data
US 2022/0123315 A1    Apr. 21, 2022

Related U.S. Application Data

(62) Division of application No. 16/551,877, filed on Aug. 27, 2019, now abandoned.

(30) Foreign Application Priority Data

Aug. 29, 2018 (JP) .................................. 2018-160424

(51) Int. Cl.
H01M 4/62    (2006.01)
H01M 4/36    (2006.01)
(Continued)

(52) U.S. Cl.
CPC .............. H01M 4/62 (2013.01); C01G 33/00 (2013.01); H01M 4/366 (2013.01);
(Continued)

(58) Field of Classification Search
CPC .......... H01M 4/366; H01M 4/62; C01G 33/00
See application file for complete search history.

(56) References Cited

U.S. PATENT DOCUMENTS

2015/0270537 A1    9/2015 Kato et al.
2016/0010221 A1*   1/2016 Doolittle ................... C25B 1/00
                                                                      205/362
(Continued)

FOREIGN PATENT DOCUMENTS

CN    105493318 A    4/2016
JP    2010-244847 A  10/2010
(Continued)

OTHER PUBLICATIONS

Wang et al., Fabricationofultrathinsolidelectrolyte membranesofb-Li3PS4nanoflakesbyevaporationinducedself-assemblyforall-solid-state batteries; J.Mater.Chem.A,2016,4,8091-8096.*

(Continued)

*Primary Examiner* — Jun Li
(74) *Attorney, Agent, or Firm* — Sughrue Mion, PLLC

(57) ABSTRACT

A lithium niobate with high lithium ion conductivity. Disclosed is a method for producing a lithium niobate for use in a covering layer covering at least part of a surface of cathode active material particles, the method comprising: preparing a solution containing niobium ions and lithium ions, drying the solution to obtain a lithium niobate precursor, and heating the lithium niobate precursor at a temperature of from 250° C. to 300° C. for a heating time of more than 0 minute and 10 minutes or less.

1 Claim, 2 Drawing Sheets

(51) Int. Cl.
  *C01G 33/00* (2006.01)
  *H01M 10/0525* (2010.01)
  *H01M 4/525* (2010.01)
  *H01M 4/02* (2006.01)
  *H01M 4/505* (2010.01)

(52) U.S. Cl.
  CPC ........ *H01M 10/0525* (2013.01); *H01M 4/505* (2013.01); *H01M 4/525* (2013.01); *H01M 2004/028* (2013.01)

(56) References Cited

U.S. PATENT DOCUMENTS

| | | |
|---|---|---|
| 2016/0064733 A1 | 3/2016 | Aso |
| 2016/0149259 A1* | 5/2016 | Osada ........................ C03C 4/18 429/323 |
| 2016/0211519 A1 | 7/2016 | Uchiyama et al. |
| 2016/0268595 A1 | 9/2016 | Miki |
| 2016/0268596 A1 | 9/2016 | Uchiyama |
| 2016/0315353 A1* | 10/2016 | Matsushita ............. H01M 4/62 |
| 2019/0036106 A1* | 1/2019 | Ishikawa .............. H01M 4/1315 |
| 2019/0379056 A1* | 12/2019 | Chen ..................... H01M 4/366 |
| 2020/0075956 A1 | 3/2020 | Sugiura et al. |

FOREIGN PATENT DOCUMENTS

| | | |
|---|---|---|
| JP | 2015-056307 A | 3/2015 |
| JP | 2015-179616 A | 10/2015 |
| JP | 2016-054026 A | 4/2016 |
| JP | 2017-091913 A | 5/2017 |

OTHER PUBLICATIONS

Sun Hongye et al., "Crystallization Processes in Amorphous LiNbO3", Ferroelectrics, 1990, vol. 101, No. 1, pp. 11-18 (9 pages total).
Non-Final Office Action dated Sep. 10, 2021, issued by the USPTO in parent U.S. Appl. No. 16/551,877.

* cited by examiner ional of application Ser. No. 16/551,877
LITHIUM NIOBATE AND METHOD FOR PRODUCING THE SAME

CROSS-REFERENCE

This is a divisional of application Ser. No. 16/551,877 filed Aug. 27, 2019, which claims priority from Japanese Patent Application No. 2018-160424 filed Aug. 29, 2018, which is incorporated by reference here in its entirety.

TECHNICAL FIELD

The disclosure relates to a lithium niobate and method for producing the same.

BACKGROUND

In recent years, with the rapid spread of IT and communication devices such as personal computers, camcorders and cellular phones, great importance has been attached to the development of batteries that can be used as the power source of such devices. In the automobile industry, etc., high-power and high-capacity batteries for electric vehicles and hybrid vehicles are under development.

Of all-solid-state batteries, an all-solid-state lithium ion battery has attracted attention, due to its high energy density resulting from the use of a battery reaction accompanied by lithium ion transfer, and due to the use of a solid electrolyte as the electrolyte present between the cathode and the anode, in place of a liquid electrolyte containing an organic solvent.

Patent Literature 1 discloses a technique to obtain an active material composite powder, in which a solution containing lithium and a peroxo complex of niobium is sprayed to the surface of an active material, and the sprayed solution is heated at a temperature of from 123° C. to 350° C. for 5 hours, thereby obtaining an active material composite powder composed of the active material and a lithium niobate attached to at least part of the surface of the active material.

Patent Literature 2 discloses a technique to obtain an active material powder, in which an alkoxide solution containing lithium ions and niobium ions is attached to the surface of particles of an active material, and in an air atmosphere, the attached alkoxide solution is heated at a temperature of 120° C. or more and 200° C. or less for 5 hours, thereby obtaining an active material powder composed of the active material particles and a coating layer containing a lithium niobate and being attached to the surface of the active material particles.

Patent Literature 1: Japanese Patent Application Laid-Open (JP-A) No. 2015-056307

Patent Literature 2: JP-A No. 2015-179616

In the techniques disclosed in Patent Literatures 1 and 2, the lithium niobate precursor heating time is as long as 5 hours. Accordingly, the techniques have a problem in that crystallization of an amorphous lithium niobate, which is produced by heating the lithium niobate precursor, is promoted, thereby forming a crystal phase of the lithium niobate and lowering the lithium ion conductivity of the lithium niobate.

SUMMARY

In light of the above circumstance, an object of the disclosed embodiments is to provide a lithium niobate with high lithium ion conductivity.

In a first embodiment, there is provided a method for producing a lithium niobate for use in a covering layer covering at least part of a surface of cathode active material particles, the method comprising:
preparing a solution containing niobium ions and lithium ions,
drying the solution to obtain a lithium niobate precursor, and
heating the lithium niobate precursor at a temperature of from 250° C. to 300° C. for a heating time of more than 0 minute and 10 minutes or less.

In a second embodiment, there is provided a lithium niobate for use in a covering layer covering at least part of a surface of cathode active material particles,
wherein an A/B ratio value between a first peak intensity value A at a diffraction angle (2θ) of 23.7°±0.5° and a second peak intensity value B at a diffraction angle (2θ) of 53.2°±0.5°, is 1.96 or more and 2.54 or less, and the peak intensities are observed by X-ray diffraction (XRD) measurement using CuKα radiation.

An object of the disclosed embodiments is to provide a lithium niobate with high lithium ion conductivity and a method for producing the same.

BRIEF DESCRIPTION OF THE DRAWINGS

In the accompanying drawings.

DETAILED DESCRIPTION

1. Method for Producing a Lithium Niobate

The method for producing a lithium niobate according to the disclosed embodiments, is a method for producing a lithium niobate for use in a covering layer covering at least part of a surface of cathode active material particles,
the method comprising:
preparing a solution containing niobium ions and lithium ions,
drying the solution to obtain a lithium niobate precursor, and
heating the lithium niobate precursor at a temperature of from 250° C. to 300° C. for a heating time of more than 0 minute and 10 minutes or less.

It was found that a lithium niobate with high lithium ion conductivity can be obtained by heating the lithium niobate precursor, which is obtained by drying the predetermined solution, at a temperature of from 250° C. to 300° C. for a heating time of more than 0 minute and 10 minutes or less. A crystallized lithium niobate is known to have low lithium ion conductivity compared to an amorphous lithium niobate.

According to the disclosed embodiments, by heating the lithium niobate precursor for a short time, crystallization of the thus-obtained amorphous lithium niobate can be suppressed.

Also, according to the disclosed embodiments, since the lithium niobate can be obtained by heating the lithium niobate precursor for a shorter time (10 minutes or less) than the conventional heating time (5 hours), the production cost can be reduced.

The method for producing a lithium niobate according to the disclosed embodiments, comprises at least the steps of (1) preparing a solution, (2) drying the solution and (3) heating the lithium niobate precursor.

Hereinafter, the steps will be described in order.

(1) Preparing a Solution

This is a step of preparing a solution containing niobium ions and lithium ions.

As the solution containing niobium ions and lithium ions, examples include, but are not limited to, a complex solution containing lithium ions and a peroxo complex of niobium (hereinafter, it may be simply referred to as "complex solution") and an alkoxide solution containing niobium ions and lithium ions (hereinafter, it may be simply referred to as "alkoxide solution"). From the viewpoint of reducing the production cost, the solution containing niobium ions and lithium ions may be the complex solution. In the disclosed embodiments, the niobium ions may be in the form of complex ions.

Figure 1:
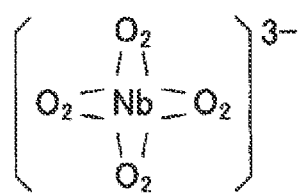
FIG. 1 is a view illustrating a peroxo complex of niobium.

FIG. 1 shows the structural formula of the peroxo complex of niobium ($[Nb(O_2)_4]^{3-}$).

As the complex solution, examples include, but are not limited to, an aqueous solution obtained by adding a lithium compound to a clear solution produced by use of hydrogen peroxide solution, niobic acid and ammonia water. The peroxo complex of niobium can be synthesized even when the moisture content rate of the niobic acid in the complex solution changes. Accordingly, the moisture content rate of the niobic acid is not particularly limited. As long as the peroxo complex of niobium can be synthesized, the mixing ratio of the niobic acid and the ammonia water is not particularly limited. As the lithium compound, examples include, but are not limited to, LiOH, $LiNO_3$ and $Li_2SO_4$.

The alkoxide solution can be produced by, for example, dissolving lithium ethoxide powder in dehydrated ethanol and, with stirring the resulting solution, mixing the solution with niobium pentaethoxide in such an amount that lithium and niobium are at a molar ratio of 1:1. As the solvent used in the alkoxide solution, examples include, but are not limited to, dehydrated ethanol, dehydrated propanol and dehydrated butanol. The molar ratio of the lithium ions to the niobium ions in the alkoxide solution is not particularly limited. For example, it may be 1:1.

(2) Drying the Solution

This is a step of drying the solution to obtain a lithium niobate precursor.

The method for drying the solution is not particularly limited, as long as the lithium niobate precursor is obtained in a powder form by drying the solvent.

The lithium niobate precursor may be a mixture of raw materials for the lithium niobate.

(3) Heating the Lithium Niobate Precursor

This is a step of heating the lithium niobate precursor at a temperature of from 250° C. to 300° C. for a heating time of more than 0 minute and 10 minutes or less.

By heating the lithium niobate precursor at the predetermined temperature for the predetermined time, an amorphous lithium niobate is produced. It is presumed that crystallization of the thus-produced amorphous lithium niobate is promoted by heating the lithium niobate precursor at a higher temperature than the predetermined temperature and/or heating the lithium niobate precursor for a longer time than the predetermined time.

The lower limit of the heating time may be more than 0 minute. From the viewpoint of increasing the lithium ion conductivity of the lithium niobate, the lower limit may be one minute or more.

The method for heating the lithium niobate precursor is not particularly limited. For example, a hot plate may be used.

The heating atmosphere is not particularly limited and may be an air atmosphere. From the viewpoint of suppressing, when the lithium niobate is used in an all-solid-state battery containing a sulfide-based solid electrolyte, deterioration of the sulfide-based solid electrolyte due to a reaction with the moisture contained in the lithium niobate, the heating atmosphere may be a vacuum atmosphere, a dry air atmosphere, a nitrogen gas atmosphere or an argon gas atmosphere, for example.

By producing the lithium niobate through the steps (1) to (3), such a lithium niobate that the below-described A/B ratio value is 1.96 or more and 2.54 or less, can be produced.

2. Lithium Niobate

The lithium niobate of the disclosed embodiments is a lithium niobate for use in a covering layer covering at least part of a surface of cathode active material particles, wherein an A/B ratio value between a first peak intensity value A at a diffraction angle (2θ) of 23.7°±0.5° and a second peak intensity value B at a diffraction angle (2θ) of 53.2°±0.5°, is 1.96 or more and 2.54 or less, and the peak intensities are observed by X-ray diffraction (XRD) measurement using CuKα radiation.

It was found that the first peak intensity value A at a diffraction angle (2θ) of 23.7°±0.5, which is observed by XRD measurement, increases as crystallization of the lithium niobate proceeds. Also, it was found that the A/B ratio value between the first peak intensity value A and the second peak intensity value B at a diffraction angle (2θ) of 53.2°±0.5°, which is less variable than the first peak intensity value A even when crystallization of the lithium niobate proceeds, serves as an index of the degree of crystallization of the lithium niobate. Finally, it was found that the lithium niobate that the A/B ratio value is 1.96 or more and 2.54 or less, has desired lithium ion conductivity.

3. Composite Active Material Particles

The lithium niobate of the disclosed embodiments is used in the covering layer covering at least part of the surface of the cathode active material particles. Accordingly, an embodiment in which the lithium niobate of the disclosed embodiments is contained, may be composite active material particles composed of the cathode active material particles and the covering layer containing the lithium niobate and covering at least part of the surface of the cathode active material particles.

Figure 2:
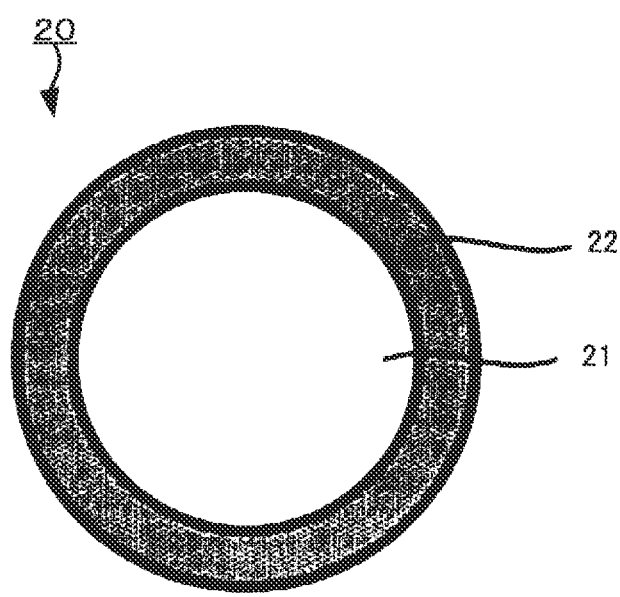
FIG. 2 is a schematic view of an example of one of the composite active material particles of the disclosed embodiments.

FIG. 2 is a schematic view of an example of one of the composite active material particles of the disclosed embodiments. FIG. 2 focuses on one of the composite active material particles and shows the composite active material particle in a simplified manner. For the sake of simplicity, FIG. 2 shows an embodiment in which the lithium niobate is attached to the surface of one cathode active material particle (or in which one cathode active material particle is covered with the lithium niobate). However, the composite active material particles of the disclosed embodiments are not limited to this embodiment. The composite active material particles of the disclosed embodiments may be such an embodiment that the lithium niobate is attached to the surface of the cathode active material particles (or the surface of the cathode active material particles is covered with the lithium niobate), the cathode active material particles being in the form of secondary particles formed by aggregation of the cathode active material particles.

As shown in FIG. 2, a composite active material particle 20 is composed of a cathode active material particle 21 and a covering layer 22 containing the lithium niobate and covering the surface of the cathode active material particle 21.

The composite active material particles composed of the cathode active material particles and the covering layer containing the lithium niobate and covering the surface of the cathode active material particles, can suppress a reaction between the cathode active material particles and the solid electrolyte in an all-solid-state battery comprising a cathode layer that contains the composite active material particles.

For the thickness of the covering layer, the lower limit may be 0.1 nm or more, or it may be 1 nm or more, for example.

On the other hand, for the thickness of the covering layer, the upper limit may be 100 nm or less, or it may be 20 nm or less. The plane-direction coverage of the covering layer on the cathode active material particle surface may be 70% or more, or it may be 90% or more, for example. The coverage may be calculated by observing scanning electron microscope (SEM) images of cross-sections of the particles, for example.

The cathode active material is not particularly limited. As the cathode active material, examples include, but are not limited to, $LiCoO_2$, $LiNi_xCo_{1-x}O_2$ (0<x<1), $LiNi_{1/3}Co_{1/3}Mn_{1/3}O_2$, $LiMnO_2$, different element-substituted Li—Mn spinels (such as $LiMn_{1.5}Ni_{0.5}O_4$, $LiMn_{1.5}Al_{0.5}O_4$, $LiMn_{1.5}Mg_{0.5}O_4$, $LiMn_{1.5}Co_{0.5}O_4$, $LiMn_{1.5}Fe_{0.5}O_4$ and $LiMn_{1.5}Zn_{0.5}O_4$), lithium titanates (such as $Li_4Ti_5O_{12}$), lithium metal phosphates (such as $LiFePO_4$, $LiMnPO_4$, $LiCoPO_4$ and $LiNiPO_4$), transition metal oxides (such as $V_2O_5$ and $MoO_3$), $TiS_2$, LiCoN, Si, $SiO_2$, $Li_2SiO_3$, $Li_4SiO_4$, and lithium storage intermetallic compounds (such as $Mg_2Sn$, $Mg_2Ge$, $Mg_2Sb$ and $Cu_3Sb$).

The average particle diameter ($D_{50}$) of the cathode active material particles may be 1 nm or more and 100 μm or less, or it may be 10 nm or more and 30 μm or less, for example.

4. Method for Producing the Composite Active Material Particles

The method for producing the composite active material particles may comprise the steps of (a) spraying a solution, (b) drying the solution and (c) heating.

(a) Spraying a Solution

This is a step of spraying a solution containing niobium ions and lithium ions to the cathode active material particles to attach the solution to the surface of the cathode active material particles.

As the solution used in this step, examples include, but are not limited to, the same solution as the solution prepared in the above-described "(1) Preparing the solution" of "1. Method for producing a lithium niobate".

As the cathode active material used in this step, examples include, but are not limited to, the same cathode active materials as those described above in "3. Composite active material particles".

(b) Drying the Solution

This is a step of drying the solution to form a lithium niobate precursor on the surface of the cathode active material particles.

By drying the solution, volatile components (such as solvent and hydration water) contained in the solution attached to the surface of the cathode active material particles, are removed. After the drying, the solution is changed into the lithium niobate precursor.

When the above-described complex solution is used as the solution, since hydrogen peroxide contained in the complex solution has strong oxidizing properties, if the complex solution is brought into contact with the cathode active material particles for a long time, the cathode active material particles may be eroded by the hydrogen peroxide, and the eroded cathode active material particles deteriorate. To suppress the deterioration of the cathode active material particles, just after the complex solution is sprayed and attached to the surface of the cathode active material particles, the complex solution present on the surface of the cathode active material particles may be dried. By this method, composite active material particles that can decrease battery reaction resistance, can be produced.

Just after spraying the complex solution, the complex solution may be dried by a tumbling/fluidizing coating device or a spray dryer, for example. As the tumbling/fluidizing coating device, examples include, but are not limited to, MULTIPLEX COATER (product name, manufactured by Powrex Corporation) and FLOW COATER (product name, manufactured by Freund Corporation). In the case of using the tumbling/fluidizing coating device, just after the complex solution is sprayed to the cathode active material particles, the complex solution is dried. Then, spraying of the complex solution to the cathode active material particles and drying the complex solution are repeated until the thickness of a layer of the lithium niobate precursor attached to the surface of the cathode active material particles, reaches a desired thickness.

(c) Heating

This is a step of heating the cathode active material particles, in which the lithium niobate precursor is attached to the particle surface, at a temperature of from 250° C. to 300° C. for a heating time of more than 0 minute and 10 minutes or less.

By heating the cathode active material particles, the composite active material particles composed of the cathode active material particles and the covering layer containing the lithium niobate and covering the surface of the cathode active material particles, can be obtained.

The method for heating the cathode active material particles is not particularly limited. For example, a hot plate may be used.

In this step, the heating atmosphere is not particularly limited, and it may be an air atmosphere. From the viewpoint of suppressing, when the composite active material particles are used in an all-solid-state battery containing a sulfide-based solid electrolyte, deterioration of the sulfide-based solid electrolyte due to a reaction with the moisture contained in the composite active material particles, the heating atmosphere may be a vacuum atmosphere, a dry air atmosphere, a nitrogen gas atmosphere or an argon gas atmosphere, for example.

In this step, by setting the heating temperature to 250° C. or more, the amount of impurities (volatile components) remaining in the solution, such as solvent and hydration water, can be decreased.

Also in this step, by setting the heating time to more than 0 minute, the amount of the impurities (volatile components) remaining in the solution, such as solvent and hydration water, can be decreased. The heating time may be one minute or more.

Since the hydration water interferes with lithium ion conduction, the lithium ion conductivity of the composite active material particles can be increased by decreasing the amount of the hydration water remaining in the solution.

The composite active material particles produced by the method for producing the composite active material particles according to the disclosed embodiments, are used in an all-solid-state battery comprising a sulfide-based solid electrolyte, for example. The sulfide-based solid electrolyte deteriorates due to a reaction with water. As a result, the reaction resistance of the all-solid-state battery is likely to increase. Accordingly, the reaction resistance of the all-solid-state battery can be decreased by decreasing the amount of the solvent remaining in the solution.

In this step, by setting the heating temperature to 300° C. or less, crystallization of the amorphous lithium niobate produced by heating the lithium niobate precursor, can be suppressed.

Also in this step, by setting the heating time to 10 minutes or less, crystallization of the amorphous lithium niobate produced by heating the lithium niobate precursor, can be suppressed.

A crystallized lithium niobate has lower lithium ion conductivity than the amorphous lithium niobate, and it may be a cause for an increase in battery reaction resistance.

From the viewpoint of decreasing battery reaction resistance, the composite active material particles of the disclosed embodiments may be contained in the cathode layer of an all-solid-state battery.

5. All-Solid-State Battery

The all-solid-state battery used in the disclosed embodiments comprises a cathode comprising a cathode layer that contains the composite active material particles of the disclosed embodiments, an anode comprising an anode layer, and a solid electrolyte layer disposed between the cathode layer and the anode layer.

Since the all-solid-state battery of the disclosed embodiments comprises the cathode comprising the cathode layer that contains the composite active material particles of the disclosed embodiments, the reaction resistance of the all-solid-state battery can be decreased.

Figure 3:
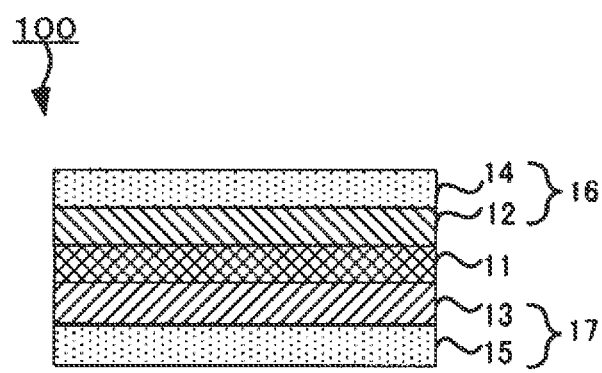
FIG. 3 is a schematic sectional view of an example of the all-solid-state battery of the disclosed embodiments.

FIG. 3 is a schematic sectional view of an example of the all-solid-state battery of the disclosed embodiments.

As shown in FIG. 3, an all-solid-state battery 100 comprises a cathode 16 comprising a cathode layer 12 and a cathode current collector 14, an anode 17 comprising an anode layer 13 and an anode current collector 15, and a solid electrolyte layer 11 disposed between the cathode 16 and the anode 17.

[Cathode]

The cathode comprises at least the cathode layer and the cathode current collector.

The cathode layer contains the composite active material particles of the disclosed embodiments. As optional components, the cathode layer may contain a solid electrolyte, an electroconductive material and a binder.

As the solid electrolyte contained in the cathode layer, examples include, but are not limited to, the same materials as the solid electrolytes that may be used in the below-described solid electrolyte layer.

The content of the solid electrolyte in the cathode layer is not particularly limited.

As the electroconductive material, examples include, but are not limited to, a carbonaceous material and a metal material. The carbonaceous material may be at least one selected from the group consisting of carbon nanotube (CNT), carbon nanofiber (CNF) and carbon blacks such as acetylene black (AB) and Ketjen Black (KB). The carbon nanotube (CNT) and carbon nanofiber (CNF) may be vapor-grown carbon fiber (VGCF).

The content of the electroconductive material in the cathode layer is not particularly limited.

As the binder, examples include, but are not limited to, acrylonitrile-butadiene rubber (ABR), butadiene rubber (BR), polyvinylidene fluoride (PVdF) and styrene-butadiene rubber (SBR). The content of the binder in the cathode layer is not particularly limited.

The thickness of the cathode layer is not particularly limited.

The method for forming the cathode layer is not particularly limited. As the method, examples include, but are not limited to, pressure-forming a powdered cathode mix that contains the composite active material particles and, as needed, other components. Another example of the method for forming the cathode layer is as follows: a cathode slurry containing the composite active material particles, a solvent and, as needed, other components, is prepared; the cathode slurry is applied on one surface of the cathode current collector or solid electrolyte layer; and the applied cathode slurry is dried, thereby forming the cathode layer. As the solvent used in the cathode slurry, examples include, but are not limited to, butyl acetate, heptane and N-methyl-2-pyrrolidone. The method for applying the cathode slurry on one surface of the cathode current collector or solid electrolyte layer, is not particularly limited. As the method, examples include, but are not limited to, a doctor blade method, a metal mask printing method, an electrostatic coating method, a dip coating method, a spray coating method, a roller coating method, a gravure coating method and a screen printing method.

As the cathode current collector, a conventionally-known metal that is usable as a current collector in all-solid-state batteries, can be used. As the metal, examples include, but are not limited to, a metal material containing one or more elements selected from the group consisting of Cu, Ni, Al, V, Au, Pt, Mg, Fe, Ti, Co, Cr, Zn, Ge and In.

The form of the cathode current collector is not particularly limited. As the form, examples include, but are not limited to, various kinds of forms such as a foil form and a mesh form.

The form of the whole cathode is not particularly limited. It may be a sheet form. In this case, the thickness of the whole cathode is not particularly limited. It can be determined depending on desired performance.

[Solid Electrolyte Layer]

The solid electrolyte layer contains at least a solid electrolyte.

As the solid electrolyte, examples include, but are not limited to, an oxide-based solid electrolyte and a sulfide-based solid electrolyte. From the viewpoint of increasing buttery power output, the solid electrolyte may be a sulfide-based solid electrolyte.

As the sulfide-based solid electrolyte, examples include, but are not limited to, $Li_2S-P_2S_5$, $Li_2S-SiS_2$, $LiX-Li_2S-SiS_2$, $LiX-Li_2S-P_2S_5$, $LiX-Li_2O-Li_2S-P_2S_5$, $LiX-Li_2S-P_2O_5$, $LiX-Li_3PO_4-P_2S_5$ and $Li_3PS_4$. The "$Li_2S-P_2S_5$" means a material composed of a raw material composition containing $Li_2S$ and $P_2S_5$, and the same applies to other solid electrolytes. Also, "X" in the "LiX" means a halogen element. The LiX contained in the raw material composition may be one or more kinds. As the sulfide-based solid electrolyte, examples include, but are not limited to, $10LiI-15LiBr-37.5Li_3PS_4$ and $20LiI-80(75Li_2S-25P_2S_5)$. The raw material composition ratios of the exemplified sulfide-based solid electrolytes are molar ratios.

The sulfide-based solid electrolytes may be a glass, a crystal material or a glass ceramic. The glass can be obtained by amorphizing a raw material composition (such as a mixture of $Li_2S$ and $P_2S_5$). The raw material composition can be amorphized by mechanical milling, for example. The mechanical milling may be dry mechanical milling or wet mechanical milling. The mechanical milling may be the latter because attachment of the raw material composition to the inner surface of a container, etc., can be prevented. The glass ceramic can be obtained by heating a glass. The crystal material can be obtained by developing a solid state reaction of the raw material composition, for example.

As the oxide-based solid electrolyte, examples include, but are not limited to, $Li_{6.25}La_3Zr_2Al_{0.25}O_{12}$, $Li_3PO_4$, and $Li_{3+x}PO_{4-x}N_x$ (LiPON).

The form of the solid electrolyte may be a particulate form.

The average particle diameter ($D_{50}$) of the solid electrolyte particles is not particularly limited. The lower limit may be 0.5 μm or more, and the upper limit may be 2 μm or less.

As the solid electrolyte, one or more kinds of solid electrolytes may be used. In the case of using two or more kinds of solid electrolytes, they may be mixed together, or they may be formed into layers to obtain a multi-layered structure.

From the viewpoint of exerting plasticity, etc., a binder for binding the solid electrolyte particles can be incorporated in the solid electrolyte layer. As the binder, examples include, but are not limited to, a binder that can be incorporated in the above-described cathode. However, the content of the binder in the solid electrolyte layer may be 5 mass % or less, from the viewpoint of preventing excessive aggregation of the solid electrolyte, enabling the formation of the solid electrolyte layer in which the solid electrolyte is uniformly dispersed, etc., for the purpose of easily achieving high power output.

The thickness of the solid electrolyte layer is not particularly limited. It is generally 0.1 μm or more and 1 mm or less.

In the disclosed embodiments, unless otherwise noted, the average particle diameter of particles is a volume-based median diameter ($D_{50}$) measured by laser diffraction/scattering particle size distribution measurement. Also in the disclosed embodiments, the median diameter ($D_{50}$) of particles is a diameter at which, when the particle diameters of particles are arranged in ascending order, the accumulated volume of the particles is half (50%) the total volume of the particles (volume average diameter).

[Anode]

The anode comprises an anode layer and an anode current collector.

The anode layer contains an anode active material.

As the anode active material, a conventionally-known material can be used. As the anode active material, examples include, but are not limited to, a lithium metal (Li), a lithium alloy, carbon, Si, a Si alloy and $Li_4Ti_5O_{12}$ (LTO).

As the lithium alloy, examples include, but are not limited to, LiSn, LiSi, LiAl, LiGe, LiSb, LiP and LiIn.

As the Si alloy, examples include, but are not limited to, an alloy with a metal such as Li, and an alloy with at least one metal selected from the group consisting of Sn, Ge and Al.

By assembling the all-solid-state battery and initially charging the battery, the Si is reacted with a metal such as Li to form an amorphous alloy. An alloyed part of the Si is kept amorphized even after metal ions such as lithium ions are released by discharging the battery. In the disclosed embodiments, therefore, the anode layer comprising Si include such an embodiment that the Si is formed into amorphous alloy.

The form of the anode active material is not particularly limited. For example, it may be a particulate form or a thin film form.

When the anode active material is in a particulate form, the average particle diameter ($D_{50}$) of the anode active material particles may be 1 nm or more and 100 μm or less, or it may be 10 nm or more and 30 μm or less, for example.

The method for forming the anode layer is not particularly limited. As the method, examples include, but are not limited to, pressure-forming a powdered anode mix that contains the anode active material and, as needed, other components. Another example of the method for producing the anode layer is as follows: an anode slurry containing the anode active material, a solvent and, as needed, other components, is prepared; the anode slurry is applied on one surface of the anode current collector or solid electrolyte layer; and the applied anode slurry is dried, thereby forming the anode layer. The solvent used in the anode slurry may be the same solvent as the one used in the cathode slurry. The method for applying the anode slurry to one surface of the anode current collector or solid electrolyte layer, may be the same method as the method for applying the cathode slurry.

As the anode current collector, a conventionally-known metal that is usable as a current collector in all-solid-state batteries, can be used. As the metal, examples include, but are not limited to, a metal material containing one or more elements selected from the group consisting of Cu, Ni, Al, V, Au, Pt, Mg, Fe, Ti, Co, Cr, Zn, Ge and In.

The form of the anode current collector is not particularly limited. As the form, examples include, but are not limited to, various kinds of forms such as a foil form and a mesh form.

The form of the whole anode is not particularly limited. It may be a sheet form. In this case, the thickness of the whole anode is not particularly limited. It can be determined depending on desired performance.

As needed, the all-solid-state battery comprises an outer casing for housing the cathode, the anode and the solid electrolyte layer.

The form of the outer casing is not particularly limited. As the form, examples include, but are not limited to, a laminate form.

The material for the outer casing is not particularly limited, as long as it is a material that is stable in electrolytes. As the material, examples include, but are not limited to, resins such as polypropylene, polyethylene and acrylic resin.

As the all-solid-state battery, examples include, but are not limited to, a lithium battery in which a lithium metal deposition-dissolution reaction is used as an anode reaction, a lithium ion battery which is charged and discharged by lithium ion transfer between the cathode and the anode, a sodium battery, a magnesium battery and a calcium battery. The all-solid-state battery may be a lithium ion battery. Also, the all-solid-state battery may be a primary or secondary battery.

As the form of the all-solid-state battery, examples include, but are not limited to, a coin form, a laminate form, a cylindrical form and a square form.

The method for producing the all-solid-state battery of the disclosed embodiments, is as follows, for example. First, the solid electrolyte layer is formed by pressure-forming a powdered solid electrolyte material. Next, the cathode layer is obtained by pressure-forming the powdered cathode mix on one surface of the solid electrolyte layer. Then, the anode layer is obtained by pressure-forming the powdered anode mix on the other surface of the solid electrolyte layer. Then, a cathode layer-solid electrolyte layer-anode layer assembly thus obtained, can be used as the all-solid-state battery.

In this case, the press pressure applied for pressure-forming the powdered solid electrolyte material, the powdered cathode mix and the powdered anode mix, is generally about 1 MPa or more and about 600 MPa or less.

The pressure applying method is not particularly limited. As the method, examples include, but are not limited to, applying pressure by use of a plate press machine, a roll press machine, etc.

Another example of the method for forming the all-solid-state battery of the disclosed embodiments, is as follows. First, the solid electrolyte layer is formed by pressure-forming the powdered solid electrolyte material. The cathode slurry is applied on one surface of the cathode current collector. The applied cathode slurry is dried, thereby obtaining the cathode comprising the cathode layer. Then, the anode slurry is applied on one surface of the anode current collector. The applied anode slurry is dried, thereby obtaining the anode comprising the anode layer. The solid electrolyte layer is disposed between the cathode layer and the anode layer to ensure that the cathode current collector, the cathode layer, the solid electrolyte layer, the anode layer and the anode current collector are arranged in this order, thereby obtaining the all-solid-state battery.

The production of the all-solid-state battery may be carried out in the state that moisture is removed from the system as much as possible. For example, it is thought to be effective to depressurize the inside of the system in the production steps and to replace the inside of the system by a substantially moisture-free gas (such as inert gas) in the production steps.

EXAMPLES

Example 1

[Preparing a Complex Solution]

First, 870.4 g of hydrogen peroxide solution at a concentration of 30 mass % was put in a container. Next, 987.4 g of ion-exchanged water and 44.2 g of niobic acid ($Nb_2O_5 \cdot 3H_2O$ ($Nb_2O_5$ moisture content: 72%)) were added thereto. Then, 87.9 g of ammonia water at a concentration of 28 mass % was added thereto. After the addition of the ammonia water, the mixture in the container was sufficiently stirred, thereby obtaining a clear solution. Next, 10.1 g of lithium hydroxide monohydrate ($LiOH \cdot H_2O$) was added to the clear solution, thereby obtaining a complex solution containing lithium ions and a peroxo complex of niobium. For the complex solution, the mol concentration of Li of and that of Nb were both 0.12 mol/kg.

[Drying the Complex Solution]

Then, the complex solution was powdered by heating at 120° C. for 60 minutes, thereby obtaining a powdered lithium niobate precursor.

[Heating the Lithium Niobate Precursor]

The powdered lithium niobate precursor was heated on a hot plate at 250° C. for 10 minutes, thereby obtaining a powdered lithium niobate.

[XRD Measurement]

Figure 4:
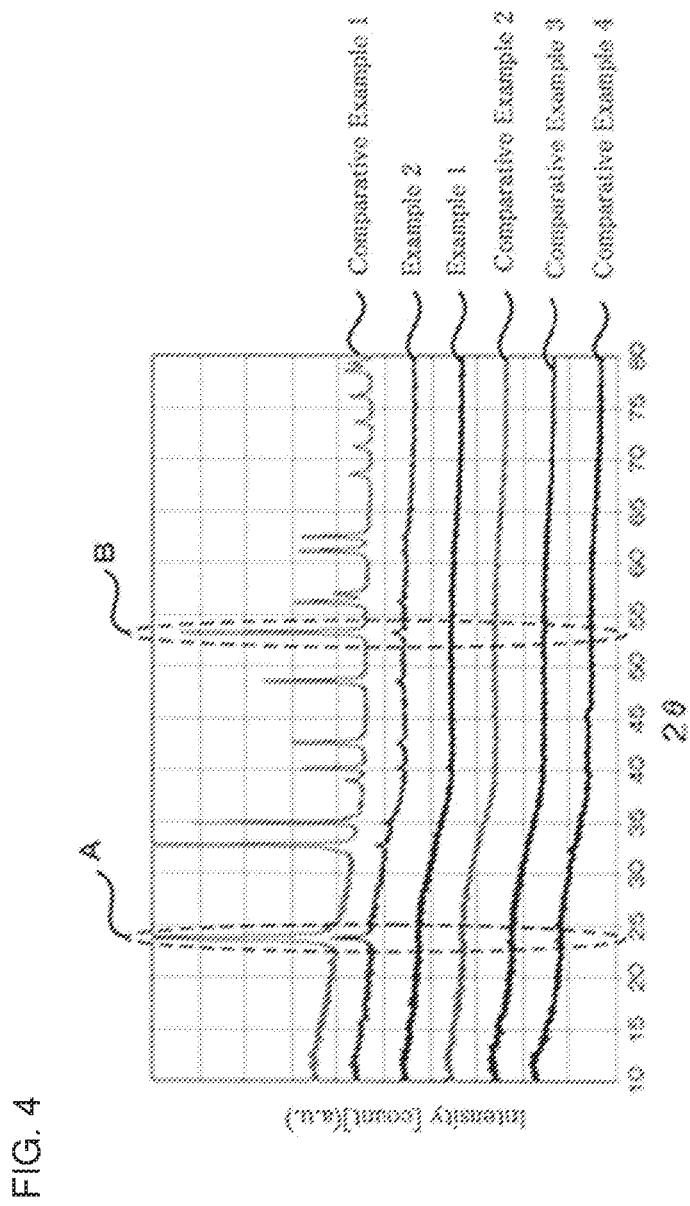
FIG. 4 is a graph of X-ray diffraction spectra obtained by XRD measurement.

The X-ray diffraction pattern of the powdered lithium niobate was measured by use of a powder X-ray diffractometer (XRD). The X-ray diffraction spectrum of the lithium niobate obtained by the XRD measurement, is shown in FIG. 4. In FIG. 4, "A" means the first peak intensity and "B" means the second peak intensity.

From the result of the XRD measurement, the A/B ratio value between the first peak intensity value A at a diffraction angle (2θ) of 23.7°±0.5° and the second peak intensity value B at a diffraction angle (2θ) of 53.2°±0.5°, was calculated. The result is shown in Table 1.

[Li Ion Conductivity Measurement]

A pellet having an area of 1 cm$^2$ and a thickness of about 0.5 mm, was obtained by pressing the powdered lithium niobate. The resistance value of the pellet at 100 kHz was obtained by AC impedance measurement. The resistance value was corrected based on the thickness of the pellet, thereby obtaining the Li ion conductivity of the lithium niobate. The result is shown in Table 1.

Example 2

The lithium niobate of Example 2 was obtained in the same manner as Example 1, except that in "Heating the lithium niobate precursor", the powdered lithium niobate precursor was heated at 300° C. Next, XRD measurement and Li ion conductivity measurement of the lithium niobate were carried out in the same manner as Example 1.

Comparative Example 1

The lithium niobate of Comparative Example 1 was obtained in the same manner as Example 1, except that in "Heating the lithium niobate precursor", the powdered lithium niobate precursor was heated at 350° C. Next, XRD measurement and Li ion conductivity measurement of the lithium niobate were carried out in the same manner as Example 1.

Comparative Example 2

The lithium niobate of Comparative Example 2 was obtained in the same manner as Example 1, except that in "Heating the lithium niobate precursor", the powdered lithium niobate precursor was heated at 200° C. Next, XRD measurement and Li ion conductivity measurement of the lithium niobate were carried out in the same manner as Example 1.

Comparative Example 3

The lithium niobate of Comparative Example 3 was obtained in the same manner as Example 1, except that in "Heating the lithium niobate precursor", the powdered lithium niobate precursor was heated at 150° C. Next, XRD measurement and Li ion conductivity measurement of the lithium niobate were carried out in the same manner as Example 1.

Comparative Example 4

The lithium niobate precursor of Comparative Example 4 was obtained in the same manner as Example 1, except that "Heating the lithium niobate precursor" was not carried out (that is, the lithium niobate precursor was not heated). Next, in the same manner as Example 1, XRD measurement and Li ion conductivity measurement of the lithium niobate precursor were carried out.

TABLE 1

|  | Temperature (° C.) | Time (min) | Li ion conductivity (S/cm) | Peak intensity ratio A/B |
|---|---|---|---|---|
| Example 1 | 250 | 10 | $1.3 \times 10^{-7}$ | 1.96 |
| Example 2 | 300 | 10 | $1.0 \times 10^{-7}$ | 2.54 |
| Comparative Example 1 | 350 | 10 | $4.3 \times 10^{-9}$ | 3.07 |

TABLE 1-continued

| | Temperature (° C.) | Time (min) | Li ion conductivity (S/cm) | Peak intensity ratio A/B |
|---|---|---|---|---|
| Comparative Example 2 | 200 | 10 | $8.6 \times 10^{-8}$ | — |
| Comparative Example 3 | 150 | 10 | $6.8 \times 10^{-8}$ | — |
| Comparative Example 4 | — | — | $4.8 \times 10^{-8}$ | — |

The lithium ion conductivity of Example 1 is higher than Example 2. The lithium ion conductivities of Comparative Examples 1 and 2 are lower than Examples 1 and 2. Accordingly, it was proved that by heating the lithium niobate precursor at a temperature in a range of from 250° C. to 300° C., the lithium ion conductivity of the lithium niobate is increased. It is presumed that this is because the lithium niobate (amorphous) is less likely to be produced when the lithium niobate precursor is heated at a temperature less than 250° C. It is also presumed that this is because excessive crystallization of the amorphous lithium niobate is promoted by heating the lithium niobate precursor at a temperature more than 300° C.

The peak intensity ratio A/B of the lithium niobate is 1.96 in Example 1, 2.54 in Example 2, and 3.07 in Comparative Example 1. Accordingly, it was proved that the lithium niobate having a peak intensity ratio A/B of from 1.96 to 2.54, has high lithium ion conductivity.

The peak intensity ratio A/B of the lithium niobate of Comparative Example 2 and that of Comparative Example 3 could not be calculated. It is presumed that this is because the lithium niobate (amorphous) is less likely to be produced when the lithium niobate precursor is heated at a temperature of 200° C. or less.

Example 3

[Preparing Cathode Active Material Particles]

$LiNi_{1/3}Mn_{1/3}Co_{1/3}O_2$ particles (manufactured by Nichia Corporation) were prepared as cathode active material particles.

[Preparing a Complex Solution]

A complex solution was obtained in the same manner as Example 1.

[Spraying and Drying the Complex Solution]

By use of 2840 g of the complex solution, 1000 g of the cathode active material particles and a tumbling/fluidizing coating device (product name: MP-01, manufactured by: Powrex Corporation), the complex solution was sprayed onto the cathode active material particles and dried at the same time, thereby covering the surface of the cathode active material particles with a layer containing the lithium niobate precursor. The operation conditions of the tumbling/fluidizing coating device were as follows:

Intake air/gas: Nitrogen
Intake air temperature: 120° C.
Intake air flow rate: 0.4 m³/min
Rotor rotation frequency: 400 rpm
Spraying rate: 4.5 g/min

[Heating]

A thus-obtained powder composed of the cathode active material particles and the layer containing the lithium niobate precursor and being formed on the surface of the particles, was heated on a hot plate at 300° C. for one minute, thereby obtaining composite active material particles composed of the $LiNi_{1/3}Mn_{1/3}Co_{1/3}O_2$ particles and the lithium niobate attached to the surface of the particles (that is, the composite active material particles of Example 3).

[Cathode]

Heptane was put in a container. The composite active material particles of Example 3 and a sulfide-based solid electrolyte ($10LiI-15LiBr-37.5Li_3PS_4$) were weighed out at a volume ratio of 6:4 and put in the container. In addition, an electroconductive material (vapor-grown carbon fiber manufactured by Showa Denko K. K.) in an amount corresponding to 3 mass % and a binder (butylene rubber manufactured by JSR Corporation) in an amount corresponding to 0.7 mass %, were put in the container containing the heptane and so on, thereby producing a cathode mixture.

Next, the cathode mixture was dispersed by an ultrasonic homogenizer (product name: UH-50, manufactured by: SMT Co., Ltd.), thereby obtaining a cathode slurry. The cathode slurry was applied onto an aluminum foil that served as a cathode current collector. The applied cathode slurry was dried at 100° C. for 30 minutes, thereby forming a cathode layer on the aluminum foil. Next, the aluminum foil on which the cathode layer was formed, was cut in a size of 1 cm², thereby obtaining a cathode composed of the aluminum foil and the cathode layer formed thereon.

[Anode]

Heptane was put in a container. An anode active material (layered carbon) and a sulfide-based solid electrolyte ($10LiI-15LiBr-37.5Li_3PS_4$) were weighed out at a volume ratio of 6:4 and put in the container. In addition, a binder (butylene rubber manufactured by JSR Corporation) in an amount corresponding to 1.2 mass % was put in the container containing the heptane, the anode active material and so on, thereby producing an anode mixture.

Next, the anode mixture was dispersed by the ultrasonic homogenizer, thereby obtaining an anode slurry. The anode slurry was applied onto a copper foil as an anode current collector. The applied anode slurry was dried at 100° C. for 30 minutes, thereby forming an anode layer on the copper foil.

Next, the copper foil on which the anode layer was formed, was cut in a size of 1 cm², thereby obtaining an anode composed of the copper foil and the anode layer formed thereon.

[Solid Electrolyte Layer]

Next, 64.8 mg of a sulfide-based solid electrolyte ($10LiI-15LiBr-37.5Li_3PS_4$) was put in a ceramic tube having an inner diameter cross-sectional area of 1 cm². After the surface of the sulfide-based solid electrolyte was leveled off, the sulfide-based solid electrolyte was pressed at 98 MPa, thereby forming a solid electrolyte layer.

[Producing an all-Solid-State Battery]

Then, the cathode and the anode were put in a ceramic tube to ensure that the solid electrolyte layer was disposed between the cathode layer and the anode layer. They were pressed at 421.4 MPa. Then, a stainless rod was inserted in the cathode side, and another stainless rod was inserted in the anode side. The resulting stack was confined at 98 MPa, thereby producing the all-solid-state battery of Example 3.

Example 4

Composite active material particles were produced in the same manner as Example 3, except that in "Heating", the powder composed of the cathode active material particles and the layer containing the lithium niobate precursor and being formed on the surface of the cathode active material particles, was heated for 10 minutes. Then, the all-solid-state battery of Example 4 was produced in the same manner as Example 3.

Comparative Example 5

Composite active material particles were produced in the same manner as Example 3, except that in "Heating", the powder composed of the cathode active material particles and the layer containing the lithium niobate precursor and being formed on the surface of the cathode active material particles, was heated for 30 minutes. Then, the all-solid-state battery of Comparative Example 5 was produced in the same manner as Example 3.

Comparative Example 6

Composite active material particles were produced in the same manner as Example 3, except that in "Heating", the powder composed of the cathode active material particles and the layer containing the lithium niobate precursor and being formed on the surface of the cathode active material particles, was heated at 200° C. Then, the all-solid-state battery of Comparative Example 6 was produced in the same manner as Example 3.

Comparative Example 7

Composite active material particles were produced in the same manner as Example 3, except that in "Heating", the powder composed of the cathode active material particles and the layer containing the lithium niobate precursor and being formed on the surface of the cathode active material particles, was heated at 200° C. for 10 minutes. Then, the all-solid-state battery of Comparative Example 7 was produced in the same manner as Example 3.

Comparative Example 8

Composite active material particles were produced in the same manner as Example 3, except that in "Heating", the powder composed of the cathode active material particles and the layer containing the lithium niobate precursor and being formed on the surface of the cathode active material particles, was heated at 200° C. for 300 minutes. Then, the all-solid-state battery of Comparative Example 8 was produced in the same manner as Example 3.

Comparative Example 9

Composite active material particles were produced in the same manner as Example 3, except that in "Heating", the powder composed of the cathode active material particles and the layer containing the lithium niobate precursor and being formed on the surface of the cathode active material particles, was heated at 200° C. for 300 minutes. Then, the all-solid-state battery of Comparative Example 9 was produced in the same manner as Example 3, except that the sulfide-based solid electrolyte used in the cathode, the anode and the solid electrolyte layer was changed to 20LiI-80 ($75Li_2S$-$25P_2S_5$).

[Reaction Resistance Measurement of the all-Solid-State Batteries]

The all-solid state battery of Example 3, which was produced by the above-described method, was charged to a voltage of 4.55 V, discharged to 2.5 V and then charged to 3.6 V. AC impedance measurement of the all-solid-battery was carried out at 3.6 V. An arc was obtained by Nyquist plot, and the reaction resistance ($\Omega \cdot cm^2$) of the all-solid-state battery was specified from the arc. In the same manner as Example 3, the reaction resistances of the all-solid-state batteries of Comparative Examples 8 and 9 were specified. The reaction resistances values of the all-solid-state batteries of Example and Comparative Examples 8 and 9, were rounded to two decimal places. The resulting values are shown in Table 2.

[Battery Power Output Measurement of the all-Solid-State Batteries]

The all-solid-state battery of Example 3 was controlled to an open-circuit voltage (OCV) of 3.66 V in the following condition:

Open-circuit voltage: 3.66 V
Cut-off voltage: 2.5 V.

Then, the maximum power value that can be discharged for 5 seconds, was measured for the all-solid-state battery by a constant power discharge method. The power value was determined as the battery power output of the all-solid-state battery. The battery power outputs of the all-solid-state batteries of Example 4 and Comparative Examples 5 to 8, were measured in the same manner as Example 3. The results are shown in Table 2.

TABLE 2

| | Temperature (° C.) | Composition of solid electrolyte | Time (min) | Reaction resistance ($\Omega \cdot cm^2$) | Battery power output (mW) |
|---|---|---|---|---|---|
| Example 3 | 300 | 10LiI—15LiBr—37.5$Li_3PS_4$ | 1 | 1.18 | 143 |
| Example 4 | 300 | 10LiI—15LiBr—37.5$Li_3PS_4$ | 10 | — | 142 |
| Comparative Example 5 | 300 | 10LiI—15LiBr—37.5$Li_3PS_4$ | 30 | — | 135 |
| Comparative Example 6 | 200 | 10LiI—15LiBr—37.5$Li_3PS_4$ | 1 | — | 136 |
| Comparative Example 7 | 200 | 10LiI—15LiBr—37.5$Li_3PS_4$ | 10 | — | 136 |
| Comparative Example 8 | 200 | 10LiI—15LiBr—37.5$Li_3PS_4$ | 300 | 1.34 | 127 |
| Comparative Example 9 | 200 | 20LiI—80($75Li_2S$—$25P_2S_5$) | 300 | 2.63 | — |

As shown in Table 2, the battery power outputs of the all-solid-state batteries of Examples 3 and 4 are higher than the all-solid-state battery of Comparative Example 5. It is presumed that this is because, by heating the lithium niobate precursor at 300° C. for 1 minute to 10 minutes, crystallization of the thus-formed amorphous lithium niobate was suppressed; the lithium niobate thus obtained was a lithium niobate with high lithium ion conductivity; and the reaction resistance of the all-solid-state battery was suppressed by using the lithium niobate in the all-solid-state battery.

The battery power outputs of the all-solid-state batteries of Comparative Examples 6 and 7 are lower than the all-solid-state batteries of Examples 3 and 4. This is because, as shown by Comparative Example 2, a lithium niobate with high lithium ion conductivity was not obtained although the lithium niobate precursor was heated at 200° C.

The battery power output of the all-solid-state battery of Comparative Example 8 is lower than the all-solid-state batteries of Comparative Examples 6 and 7. The reaction resistance of the all-solid-state battery of Comparative Example 8 is higher than the all-solid-state battery of Example 3. This is because, by heating the lithium niobate precursor for a long time, crystallization of the lithium niobate was promoted, and the lithium niobate thus obtained was a lithium niobate with low lithium ion conductivity.

The reaction resistance of the all-solid-state battery of Example 3 is remarkably higher than the all-solid-state battery of Comparative Example 9. Accordingly, for the all-solid-state battery in which the composite active material particles containing the lithium niobate of the disclosed embodiments are used in the cathode layer, it was proved that the reaction resistance of the all-solid-state battery is decreased lower than the all-solid-state battery in which the composite active material particles containing the conventional lithium niobate are used in the cathode layer.

As shown in Table 1, the lithium ion conductivity of the lithium niobate of Example 1 is higher than the lithium niobate of Example 2. Accordingly, for the all-solid-state battery in which the composite active material particles containing the lithium niobate obtained by heating the lithium niobate precursor at 250° C. for 1 minute to 10 minutes, are used in the cathode layer, it is presumed that the all-solid-state battery obtains the same battery power output as the all-solid-state batteries of Examples 3 and 4.

REFERENCE SIGNS LIST

11. Solid electrolyte layer
12. Cathode layer
13. Anode layer
14. Cathode current collector
15. Anode current collector
16. Cathode
17. Anode
20. Composite active material particle
21. Cathode active material particle
22. Covering layer
100. All-solid-state battery
A. First peak intensity value
B. Second peak intensity value

The invention claimed is:

1. A method for producing an all-solid-state battery, the method comprising:
preparing a solution containing niobium ions and lithium ions,
drying the solution to obtain a lithium niobate precursor, and
obtaining a lithium niobate by heating the lithium niobate precursor at a temperature of from 250° C. to 300° C. for a heating time of more than 0 minute and 10 minutes or less, and
wherein an A/B ratio value of the lithium niobate between a first peak intensity value A at a diffraction angle (2θ) of 23.7°±0.5° and a second peak intensity value B at a diffraction angle (2θ) of 53.2°±0.5°, is 1.96 or more and 2.54 or less, and the peak intensities are observed by X-ray diffraction (XRD) measurement using CuKα radiation;
wherein the all-solid-state battery comprises a cathode comprising a cathode layer, an anode comprising an anode layer, and a solid electrolyte layer disposed between the cathode layer and the anode layer;
wherein the cathode layer contains composite active material particles;
wherein the composite active material particles are composed of cathode active material particles and a covering layer;
wherein the covering layer contains the lithium niobate and covering at least part of the surface of the cathode active material particles;
wherein the solid electrolyte layer contains a sulfide-based solid electrolyte; and
wherein the sulfide-based solid electrolyte contains 10LiI-15LiBr-37.5Li$_3$PS$_4$ as a raw material composition.

* * * * *